United States Patent
Seo et al.

(10) Patent No.: US 10,633,561 B2
(45) Date of Patent: Apr. 28, 2020

(54) ADHESIVE COMPOSITION FOR OPTICAL USE AND ADHESIVE FILM FOR OPTICAL USE COMPRISING ADHESIVE LAYER COMPRISING PHOTOCURED PRODUCT THEREOF

(71) Applicant: LG Chem, Ltd., Seoul (KR)

(72) Inventors: Kwang Su Seo, Daejeon (KR); Joo Hyun Lee, Daejeon (KR); Chan Oh Yoon, Daejeon (KR); Jang Soon Kim, Daejeon (KR)

(73) Assignee: LG Chem, Ltd. (KR)

( * ) Notice: Subject to any disclaimer, the term of this patent is extended or adjusted under 35 U.S.C. 154(b) by 27 days.

(21) Appl. No.: 16/094,676

(22) PCT Filed: Apr. 21, 2017

(86) PCT No.: PCT/KR2017/004284
§ 371 (c)(1),
(2) Date: Oct. 18, 2018

(87) PCT Pub. No.: WO2017/183940
PCT Pub. Date: Oct. 26, 2017

(65) Prior Publication Data
US 2019/0119528 A1  Apr. 25, 2019

(30) Foreign Application Priority Data
Apr. 22, 2016 (KR) .................. 10-2016-0049630

(51) Int. Cl.
| | |
|---|---|
| *C09J 109/00* | (2006.01) |
| *C09J 113/00* | (2006.01) |
| *C09J 7/30* | (2018.01) |
| *C09J 7/10* | (2018.01) |
| *C08C 19/38* | (2006.01) |
| *G02F 1/1333* | (2006.01) |

(52) U.S. Cl.
CPC .............. *C09J 7/30* (2018.01); *C08C 19/38* (2013.01); *C09J 7/10* (2018.01); *C09J 109/00* (2013.01); *C09J 113/00* (2013.01); *C09J 2201/622* (2013.01); *C09J 2203/318* (2013.01); *C09J 2203/326* (2013.01); *C09J 2205/102* (2013.01); *C09J 2409/00* (2013.01); *G02F 1/1333* (2013.01)

(58) Field of Classification Search
CPC . C09J 7/30; C09J 109/00; C09J 113/00; C09J 7/10; C09J 2203/318; C09J 2201/622; C09J 2409/00; C09J 2205/02; C09J 2203/326; C09J 7/20; C08C 19/38; G02F 1/1333
See application file for complete search history.

(56) References Cited

U.S. PATENT DOCUMENTS 3,609,110 A * 9/1971 Kumanotani .......... C08C 19/38
                                                       524/572
2014/0329927 A1   11/2014 Ha et al.

FOREIGN PATENT DOCUMENTS

| KR | 20130063937 A | 6/2013 |
|---|---|---|
| KR | 20140048346 A | 4/2014 |
| KR | 20140049278 A | 4/2014 |
| KR | 20140050956 A | 4/2014 |
| KR | 20140104478 A | 8/2014 |
| KR | 20140126725 A | 10/2014 |

OTHER PUBLICATIONS

Search report from International Application No. PCT/KR2017/004284, dated Aug. 1, 2017.

* cited by examiner

*Primary Examiner* — Jessica M Roswell
(74) *Attorney, Agent, or Firm* — Lerner, David, Littenberg, Krumholz & Mentlik, LLP

(57) ABSTRACT

The present specification provides an adhesive composition for optical use, including a polybutadiene rubber having a reactive group including one or more selected from the group consisting of a hydroxy group and a (meth)acrylate group, the reactive group bonded to a main chain thereof, and an adhesive film for optical film, including an adhesive layer including a photocured product of the adhesive composition for optical use.

14 Claims, No Drawings

ADHESIVE COMPOSITION FOR OPTICAL USE AND ADHESIVE FILM FOR OPTICAL USE COMPRISING ADHESIVE LAYER COMPRISING PHOTOCURED PRODUCT THEREOF

CROSS-REFERENCE TO RELATED APPLICATION(S)

The present specification application is a national phase entry under 35 U.S.C. § 371 of International Application No. PCT/KR2017/004284, filed on Apr. 21, 2017, which claims priority to Korean Patent Application No. 10-2016-0049630, filed on Apr. 22, 2016, the disclosures of which are incorporated herein by reference.

TECHNICAL FIELD

The present invention relates to an adhesive composition for optical use, and an adhesive film for optical use, including an adhesive layer including a photocured product thereof.

BACKGROUND ART

Touch materials including packaged electronic devices or transparent conductive films, and the like need excellent touch sensitivity for an excellent operation. Furthermore, a lot of interests have been recently focused on the development of an adhesive composition for improving durability, flexibility and optical characteristics of a device such as a flexible touch screen panel.

In general, an adhesive agent used in a flexible touch screen panel, and the like needs to secure optical characteristics such as flexibility, transparency, and visibility. For this purpose, in the related art, an adhesive agent including an acrylic resin as a base resin has been generally used, but needs to be complemented in terms of touch sensitivity, and simultaneously, it is an important problem to secure a suitable storage modulus and optical characteristics.

In addition, adhesive agents using a rubber-based resin also have been developed in order to complement the disadvantages of the acrylic resins, and for example, the official gazette of Korean Patent Application Laid-Open No. 2014-0050956 discloses an adhesive composition including a rubber-based polymer, and the official gazette of Korean Patent Application Laid-Open No. 2014-0049278 also discloses that a butyl rubber-based polymer is used in order to lower a water vapor transmission rate.

However, an adhesive agent including a rubber-based resin as a base resin has problems in that it is difficult to achieve the chemical cross-linkage through a curing process, and a physical cross-linkage needs to be used, and as a result, it is difficult to form a curing or crosslinking structure for securing sufficient durability. Furthermore, the application of final products may be limited due to the problems.

REFERENCES OF THE RELATED ART

Patent Documents

Korean Patent Application Laid-Open No. 10-2014-0050956 A
Korean Patent Application Laid-Open No. 10-2014-0049278 A

DETAILED DESCRIPTION OF THE INVENTION

Technical Problem

The present invention has been made in an effort to provide an adhesive composition for optical use, and an adhesive film for optical use, including an adhesive layer including a photocured product thereof.

Technical Solution

An exemplary embodiment of the present invention provides an adhesive composition for optical use, including: a polybutadiene rubber having a reactive group including one or more selected from the group consisting of a hydroxy group and a (meth)acrylate group, the reactive group bonded to a main chain thereof, in which the polybutadiene rubber includes a structural unit represented by the following Chemical Formula 1, and a molar ratio of a cis structure and a trans structure of the structural unit represented by the following Chemical Formula 1 is 9:1 to 10:0.

[Chemical Formula 1]

The polybutadiene rubber may further include a structural unit represented by the following Chemical Formula 2.

[Chemical Formula 2]

In Chemical Formula 2,

R3 is a hydroxy group; $H_2C=C(R5)-COO-*$; or $H_2C=C(R6)-COO-R7-NH-COO-*$,

R5 and R6 are each independently hydrogen; or a substituted or unsubstituted alkyl group having 1 to 10 carbon atoms, and R7 is a direct bond; or a substituted or unsubstituted alkylene group having 1 to 10 carbon atoms.

The structural unit represented by Chemical Formula 2 may include at least one of structural units represented by the following Chemical Formulae 2-1 to 2-3.

[Chemical Formula 2-1]

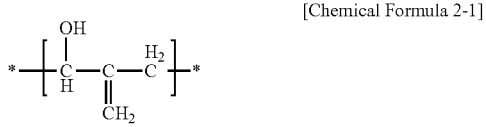

-continued

[Chemical Formula 2-2]

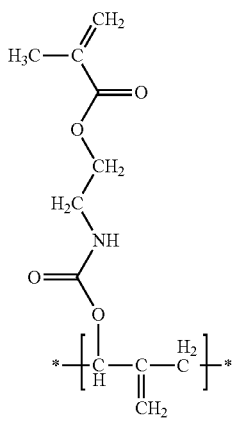

[Chemical Formula 2-3]

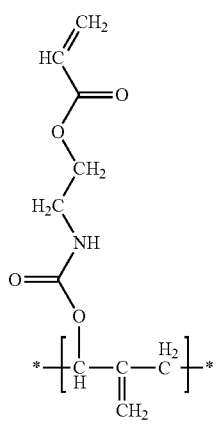

Both ends of the polybutadiene rubber may be each independently hydrogen; or a substituted or unsubstituted alkyl group having 1 to 16 carbon atoms.

The polybutadiene rubber may be represented by the following Chemical Formula 3.

[Chemical Formula 3]

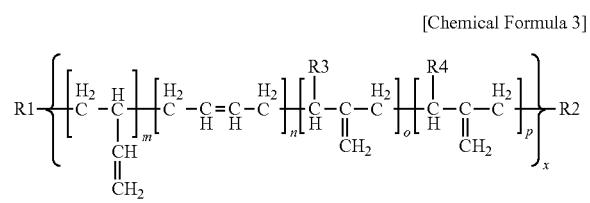

In Chemical Formula 3,

R1 and R2 are each hydrogen; or a substituted or unsubstituted alkyl group having 1 to 16 carbon atoms, R3 is a hydroxy group, R4 is $H_2C=C(R5)-COO-*$; or $H_2C=C(R6)-COO-R7-NH-COO-*$, R5 and R6 are each independently hydrogen; or a substituted or unsubstituted alkyl group having 1 to 10 carbon atoms, R7 is a direct bond; or a substituted or unsubstituted alkylene group having 1 to 10 carbon atoms, m is 0 mol % to 9 mol %, n is 75 mol % to 100 mol %, o is 0 mol % to 15 mol %, p is 0 mol % to 10 mol %, a sum of n, o, and p is 91 mol % to 100 mol %, and x is an integer of 150 or more and 20,000 or less.

The polybutadiene rubber may have a number average molecular weight (Mn) of 10,000 to 1,000,000.

The polybutadiene rubber may have a hydroxyl value (OH value) of 1 mgKOH/g to 20 mgKOH/g.

The polybutadiene rubber may include the (meth)acrylate group in an amount of 1 wt % to 10 wt %.

The adhesive composition for optical use may further include one or more selected from the group consisting of a photoinitiator, a photo-crosslinking agent, and an adhesion promoter.

Another exemplary embodiment of the present invention provides an adhesive film for optical use, including: an adhesive layer which includes a photocured product of the adhesive composition for optical use.

The adhesive layer may have a glass transition temperature (Tg) of −106° C. to −70° C.

The adhesive layer may have a storage modulus of 2.0 MPa to 8.0 MPa at −60° C., 0.4 MPa to 1.0 MPa at −40° C., 0.1 MPa to 1.0 MPa at 0° C., 0.05 MPa to 0.2 MPa at 20° C., and 0.05 MPa to 0.2 MPa at 60° C.

The adhesive layer may have a light transmittance of 90% or more.

The adhesive layer may have a water vapor transmission rate (WVTR) of 1.0 g/m²·24 hr to 50.0 g/m²·24 hr.

Advantageous Effects

The adhesive composition for optical use may impart excellent water vapor transmission resistance and chemical resistance to optical devices or electronic devices to which the adhesive composition is applied, and may implement excellent long-term durability, deformation resistance, and optical characteristics.

Further, the adhesive film for optical use may be utilized in various electronic devices as compared to an existing adhesive film including an acrylic resin or a rubber-based resin as a base resin, and may exhibit excellent attaching properties and long-term reliability.

Mode for Invention

The benefits and features of the present invention, and the methods of achieving the benefits and features will become apparent with reference to Examples to be described below. However, the present invention is not limited to Examples to be disclosed below, but may be implemented in various other forms, and the present Examples are only provided for rendering the disclosure of the present invention complete and for fully representing the scope of the invention to a person with ordinary skill in the art to which the present invention pertains, and the present invention will be defined only by the scope of the claims.

An exemplary embodiment of the present invention provides an adhesive composition for optical use, which includes a rubber chemically crosslinkable through an appropriate curing process, and as a result, it is possible to secure excellent long-term durability, water vapor transmission resistance, deformation resistance, and chemical resistance and to provide excellent optical characteristics.

Another exemplary embodiment of the present invention provides an adhesive film for optical use, which implements excellent durability and deformation resistance when applied to electronic devices because rubber itself may be chemically cross-linked and cured, and has excellent optical characteristics and improved adhesion performance and water vapor transmission resistance.

An exemplary embodiment of the present invention provides an adhesive composition for optical use, including: a polybutadiene rubber having a reactive group including one or more selected from the group consisting of a hydroxy group and a (meth)acrylate group, the reactive group bonded to a main chain thereof, in which the polybutadiene rubber includes a structural unit represented by the following Chemical Formula 1, and a molar ratio of a cis structure and a trans structure of the structural unit represented by the following Chemical Formula 1 is 9:1 to 10:0.

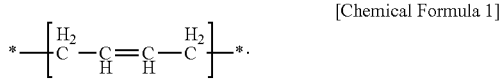

[Chemical Formula 1]

In the chemical formulae of the present specification, the "*" portion may mean a moiety in which a structural unit is linked to a main chain, or may mean a moiety to which a substituent is bonded.

Further, in the present specification, the 'structural unit' is a chemical structure constituting the main chain of a polybutadiene rubber, and means a chemical structure derived from any one monomer among a plurality of monomers for polymerizing and forming the polybutadiene rubber.

The adhesive composition for optical use is an adhesive composition used in an optical device, and may be used in, for example, a flexible touch screen panel, and the like to perform a sealing function of blocking moisture and oxygen introduced from the outside. As described above, the performance of blocking moisture and oxygen refers to a barrier performance. In general, for an adhesive agent for optical use, an acrylate-based resin is used as a base resin for optical characteristics instead of rubber, and a rubber-based resin may be more advantageous in terms of improving the barrier performance.

The rubber used in an adhesive agent in the related art was subjected to physical crosslinking through thermal curing or photocuring based on sulfur, or subjected to crosslinking by substituting the rubber itself with halogen. Alternatively, rubber was contained in an adhesive agent by a method of mixing a photocurable monomer with the rubber in the adhesive agent to cure the photocurable monomer by light irradiation.

In the case where sulfur or halogen components are used in an adhesive agent, a problem such as corrosion may be caused when the adhesive agent is applied to a final electronic product, and as a result, the application range is narrow, and in the case where a photocurable monomer is used, there is a problem in that the durability is not good because the rubber itself does not participate in the curing, and there is a limitation in improving flexibility because it is difficult to implement a sufficiently low glass transition temperature.

In contrast, the adhesive composition for optical use according to an exemplary embodiment of the present invention may secure characteristics in that a chemically-modified rubber itself may be photocured by using the chemically-modified rubber, and may obtain a benefit of solving the above-described problem.

According to an exemplary embodiment of the present invention, a molar ratio of a cis structure and a trans structure of the structural unit represented by Chemical Formula 1 may be 9:1 to 10:0. Specifically, according to an exemplary embodiment of the present invention, the molar ratio of the cis structure and the trans structure of the structural unit represented by Chemical Formula 1 included in the polybutadiene rubber may be 90:10 to 98:2, or 93:7 to 98:2.

Specifically, according to an exemplary embodiment of the present invention, the polybutadiene rubber may include the cis structure of the structural unit represented by Chemical Formula 1 in an amount of about 90 mol % or more, for example, about 90 mol % to about 100 mol %, for example, about 90 mol % to about 98 mol %, and for example, about 93 mol % to about 98 mol %.

The mol % range of the cis structure of the structural unit represented by Chemical Formula 1 and included in the polybutadiene rubber may mean a mol % range which the cis structure of the structural unit represented by Chemical Formula 1 occupies in the total 100 mol % of the structural unit containing double bonds included in the polybutadiene rubber. Specifically, the cis structure of the structural unit represented by Chemical Formula 1 and included in the polybutadiene rubber may increase the ductility of the polybutadiene rubber by preventing packing of polymer chains to hinder the formation of crystallinity and thus improving the mobility of the chains, and may serve to lower the glass transition temperature of the polybutadiene rubber.

When the polybutadiene rubber includes the cis structure of the structural unit represented by Chemical Formula 1 in a content within the range, the glass transition temperature (Tg) of the adhesive composition for optical use may be sufficiently lowered, and excellent viscoelasticity may be secured, thereby improving the flexibility, moldability, long-term durability, impact resistance, and the like of an adhesive layer formed by using the adhesive composition for optical use.

When the content of the cis structure of the structural unit represented by Chemical Formula 1 and included in the polybutadiene rubber is less than the range, the glass transition temperature of the adhesive composition for optical use may not be sufficiently lowered, so that the flexibility and impact resistance of the adhesive layer formed by using the adhesive composition for optical use deteriorate, and as a result, the moldability may be weakened, and deformation may occur when the adhesive layer is applied to a final article and is bent.

When the polybutadiene rubber includes the trans structure of the structural unit represented by Chemical Formula 1 within the range, the durability, tensile strength, and elasticity of the adhesive layer formed by using the adhesive composition for optical use may be improved, and an excellent restoration performance may be secured when the adhesive layer is bent.

According to an exemplary embodiment of the present invention, the polybutadiene rubber may further include a structural unit represented by the following Chemical Formula 4.

[Chemical Formula 4]

When the polybutadiene rubber further includes the structural unit represented by Chemical Formula 4, the flowability of the polybutadiene rubber may be improved, and excellent moldability may be implemented.

According to an exemplary embodiment of the present invention, the polybutadiene rubber may include all of the cis structure of the structural unit represented by Chemical Formula 1, the trans structure of the structural unit represented by Chemical Formula 1, and the structural unit represented by Chemical Formula 4, and in this case, it is possible to easily secure uniform viscoelasticity and excellent moldability.

According to an exemplary embodiment of the present invention, the polybutadiene rubber may further include a structural unit represented by the following Chemical Formula 2.

[Chemical Formula 2]

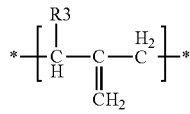

In Chemical Formula 2,

R3 is a hydroxy group; $H_2C=C(R5)$-COO—*; or $H_2C=C(R6)$-COO—R7-NH—COO—*,

R5 and R6 are each independently hydrogen; or a substituted or unsubstituted alkyl group having 1 to 10 carbon atoms, and R7 is a direct bond; or a substituted or unsubstituted alkylene group having 1 to 10 carbon atoms.

According to an exemplary embodiment of the present invention, the structural unit represented by Chemical Formula 2 may include at least one of structural units represented by the following Chemical Formulae 2-1 to 2-3.

[Chemical Formula 2-1]

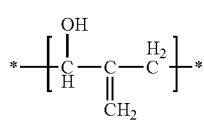

[Chemical Formula 2-2]

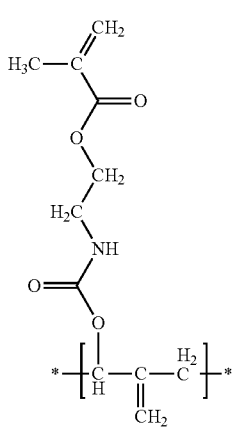

[Chemical Formula 2-3]

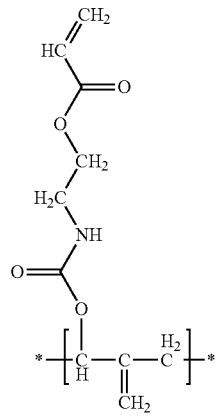

According to an exemplary embodiment of the present invention, the structural unit represented by Chemical Formula 2 may include both a structural unit including a hydroxy group and a structural unit including a (meth) acrylate group.

According to an exemplary embodiment of the present invention, the structural unit represented by Chemical Formula 2 may include the structural unit represented by Chemical Formula 2-1, the structural unit represented by Chemical Formula 2-2, and/or the structural unit represented by Chemical Formula 2-3.

The structural unit represented by Chemical Formula 2 may improve the adhesive strength by imparting polarity to the polybutadiene rubber, and may serve to improve the compatibility with other additives. Furthermore, the structural unit represented by Chemical Formula 2 may serve to improve the durability of the polybutadiene rubber.

Specifically, the structural unit represented by Chemical Formula 2-1 may implement an improvement in adhesive strength and an improvement in compatibility by imparting polarity to the polybutadiene rubber, and the structural units represented by Chemical Formulae 2-2 and 2-3 may aid in securing the durability of an adhesive layer formed by using the adhesive composition for optical use by adjusting the crosslinking position of a cured product when the adhesive composition for optical use is cured.

According to an exemplary embodiment of the present invention, both ends of the polybutadiene rubber may be each independently hydrogen; or a substituted or unsubstituted alkyl group having 1 to 16 carbon atoms.

In the present specification, "substituted or unsubstituted" means being substituted with one or more substituents selected from the group consisting of a halogen group, a nitrile group, a nitro group, a hydroxy group, an alkyl group, a cycloalkyl group, an alkenyl group, an alkoxy group, an aryloxy group, a thiol group, an alkylthio group, an allylthio group, a sulfoxy group, an alkylsulfoxy group, an arylsulfoxy group, a silyl group, a boron group, an arylamine group, an aralkylamine group, an alkylamine group, an aryl group, a fluorenyl group, a carbazole group, an arylalkyl group, an arylalkenyl group, a heterocyclic group, and an acetylene group, or having no substituent.

In the present specification, "an alkoxy group" may be straight, branched, or cyclic. The number of carbon atoms of the alkyl group is not particularly limited, but may be 1 to 16, or 1 to 10. Specific examples thereof include a methyl group, an ethyl group, an n-propyl group, an iso-propyl group, an n-butyl group, a sec-butyl group, a t-butyl group, an n-pentyl group, an iso-pentyl group, a neo-pentyl group, an n-hexyl group, a cyclopropyl group, a cyclobutyl group, a cyclopentyl group, a cyclohexyl group, and the like, but are not limited thereto.

In the present specification, "an alkylene group" may mean the divalent alkyl group, and may mean that one more bonding group is added to the alkyl group.

According to an exemplary embodiment of the present invention, the polybutadiene rubber may be represented by the following Chemical Formula 3.

[Chemical Formula 3]

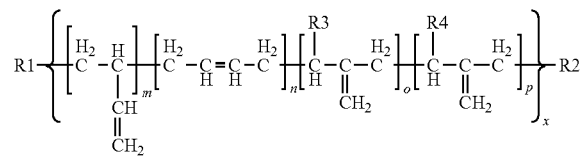

In Chemical Formula 3,

R1 and R2 are each hydrogen; or a substituted or unsubstituted alkyl group having 1 to 16 carbon atoms, R3 is a hydroxy group, R4 is $H_2C=C(R5)-COO-*$; or $H_2C=C(R6)-COO-R7-NH-COO-*$, R5 and R6 are each independently hydrogen; or a substituted or unsubstituted alkyl group having 1 to 10 carbon atoms, R7 is a direct bond; or a substituted or unsubstituted alkylene group having 1 to 10 carbon atoms, m is 0 mol % to 9 mol %, n is 75 mol % to 100 mol %, o is 0 mol % to 15 mol %, p is 0 mol % to 10 mol %, a sum of n, o, and p is 91 mol % to 100 mol %, and x is an integer of 150 or more and 20,000 or less.

According to an exemplary embodiment of the present invention, the polybutadiene rubber may have a number average molecular weight (Mn) of about 10,000 to about 1,000,000. According to an exemplary embodiment of the present invention, the polybutadiene rubber may have a number average molecular weight (Mn) of about 100,000 to about 500,000.

Since the polybutadiene rubber maintains a number average molecular weight (Mn) within the range, a physical entanglement site by the crosslinking structure after photocuring may be sufficiently secured, and excellent compatibility may be secured by providing sites in which organic and inorganic particles may be uniformly distributed. Further, the adhesive composition for optical use secures an appropriate viscosity by using the polybutadiene rubber having a number average molecular weight (Mn) within the range as a base component, and thus may exhibit excellent coatability without a problem such dewetting when the adhesive composition is prepared as an adhesive film or an adhesive sheet. When the number average molecular weight of the polybutadiene rubber is less than the range, durability and impact resistance may deteriorate. When the number average molecular weight of the polybutadiene rubber is more than the range, the processability and flexibility may deteriorate, and there may occur a problem in that it is difficult to implement stable physical properties because it is difficult to uniformly distribute an additive.

As described above, the adhesive composition for optical use may secure photocurable characteristics itself by using the chemically modified polybutadiene rubber, and may implement excellent durability, water vapor transmission resistance, flexibility, chemical resistance, and the like.

Specifically, the chemically modified polybutadiene rubber may include a hydroxy group and a (meth)acrylate group.

Furthermore, the polybutadiene rubber includes the hydroxy group and the (meth)acrylate group, and simultaneously, does not include a carboxyl group, an amine group, an aldehyde group, and the like, thereby improving an effect of preventing corrosion, preventing adhesive strength from deteriorating, and implementing excellent long-term durability when the adhesive composition for optical use is applied to a final article.

According to an exemplary embodiment of the present invention, the hydroxy group included in the polybutadiene rubber is a polar functional group, and may serve to improve the compatibility with other polar additives and easily secure an effect of improving adhesive strength.

According to an exemplary embodiment of the present invention, the polybutadiene rubber may have a hydroxyl value (OH value) of about 1 mgKOH/g to about 20 mgKOH/g. Specifically, the polybutadiene rubber may have a hydroxyl value (OH value) of 3 mgKOH/g to 10 mgKOH/g.

According to an exemplary embodiment of the present invention, the average number of hydroxyl groups in one molecule of the polybutadiene rubber may be 1 to 10, specifically 2 to 5.

Since the hydroxy group value of the polybutadiene rubber maintains the range, the glass transition temperature may be maintained at an appropriate level without being excessively increased, thereby implementing excellent adhesive strength, processability, and durability.

When the hydroxy group value of the polybutadiene rubber is less than the range, the adhesive strength may deteriorate and the durability may be weakened. When the hydroxy group value of the polybutadiene rubber is more than the range, the glass transition temperature is excessively increased, and as a result, the storage modulus value is increased, so that there may occur a problem in that deformation easily occur and water vapor transmission resistance deteriorates.

Furthermore, the hydroxy group may be introduced into double bonds of each of the cis or trans structural unit of Chemical Formula 1 and the structural unit of Chemical Formula 4, which are included in the polybutadiene rubber.

According to an exemplary embodiment of the present invention, the (meth)acrylate group included in the polybutadiene rubber may serve as a cross-linkage to improve the durability, impact resistance, and moldability, and may serve to easily secure excellent dimensional stability by securing a stable matrix.

According to an exemplary embodiment of the present invention, the polybutadiene rubber may include an acrylate group. Specifically, when the polybutadiene rubber includes an acrylate group, the width of an increase in glass transition temperature is smaller, so that the viscoelasticity is excellent, and when the polybutadiene rubber is applied to a final article and then bent, the restoration performance against deformation may be better, as compared to when the polybutadiene rubber includes a (meth)acrylate group.

The polybutadiene rubber may include the (meth)acrylate group in an amount of about 1 wt % to about 10 wt %.

Since the wt % of the (meth)acrylate group included in the polybutadiene rubber maintains the range, excellent crosslinking density and viscoelasticity may be implemented, and simultaneously, it is possible to easily secure an effect of improving durability, impact resistance, and restorability. When the wt % of the (meth)acrylate group included in the polybutadiene rubber is less than the range, the crosslinking density deteriorates, and as a result, the durability may be weakened, and there may occur a problem in that the restorability deteriorates. When the content of the (meth) acrylate group included in the polybutadiene rubber is more than the wt % range, the flexibility deteriorates, and as a result, the moldability may be weakened.

Furthermore, the (meth)acrylate group may be introduced into double bonds of each of the cis or trans structural unit of Chemical Formula 1 and the structural unit of Chemical Formula 4, which are included in the polybutadiene rubber.

The hydroxy group and the (meth)acrylate group included in the polybutadiene rubber are produced in double bonds of each of the cis or trans structural unit of Chemical Formula 1 and the structural unit of Chemical Formula 4, thereby forming a functional group.

According to an exemplary embodiment of the present invention, the adhesive composition for optical use may further include one or more selected from the group consisting of a photoinitiator, a photo-crosslinking agent, and an adhesion promoter.

The photoinitiator may serve to induce photocuring, and is not particularly limited in type, but may include one or more selected from the group consisting of, for example, alpha-hydroxyketones, phenylglyoxylates, benzyldimethyl-ketals, alpha-aminoketones, monoacylphosphines, bisacyl-phosphines, phosphine oxides, metallocenes, and iodonium salts.

The photo-crosslinking agent serves to induce crosslinkage between the polybutadiene rubbers, and is not particularly limited in type, but may include one or more selected from the group consisting of, for example, difunctional or more acrylate-based and benzophenone-based photo-crosslinking agents.

The adhesive composition for optical use includes a rubber component, and thus may implement an excellent barrier performance due to the low water vapor transmission rate, but has an aspect in that it is difficult to secure sufficient peel strength and attaching strength. Accordingly, the adhesive composition for optical use may further include an adhesion promoter, if necessary.

According to an exemplary embodiment of the present invention, the adhesion promoter may include one or more selected from the group consisting of a hydrogenated dicyclopentadiene-based compound, a hydrogenated terpene-based compound, a hydrogenated rosin-based compound, a hydrogenated aromatic compound, and a hydrogenated petroleum-based compound. The adhesion promoter includes a compound having a hydrogenated structure and thus may be advantageous in implementing transparency, and may implement excellent attaching strength and peel strength because the adhesion promoter is less affected by the thermal energy during the thermal curing.

Specifically, according to an exemplary embodiment of the present invention, the adhesion promoter may include a hydrogenated dicyclopentadiene-based compound or a hydrogenated rosin-based compound, and in this case, it is possible to obtain an effect in that particularly, the tack performance is imparted and optical characteristics such as light transmittance and haze are improved.

Another exemplary embodiment of the present invention provides an adhesive film for optical use, including: an adhesive layer which includes a photocured product of the adhesive composition for optical use.

The adhesive film for optical use is applied to an optical device such as a display, an electronic device, and an organic light emitting device (OLED), and may simultaneously implement excellent optical characteristics and barrier performance through an adhesive layer including a photocured product of the adhesive composition for optical use.

The adhesive layer includes the photocured product of the adhesive composition for optical use, and the cured product may be a photocured product prepared by adding light energy to the adhesive composition for optical use and curing the adhesive composition for optical use.

According to an exemplary embodiment of the present invention, the adhesive layer may have a glass transition temperature (Tg) of about −106° C. to about −70° C.

Since the glass transition temperature of the adhesive layer maintains the range, it is possible to implement excellent flexibility and processability, and it is possible to maximize dimensional stability and long-term durability in the physical driving such as bending of a flexible device to which the adhesive film for optical use is applied. Specifically, the adhesive layer may implement excellent flexibility because the polybutadiene rubber included in the adhesive composition for optical use includes the cis structural unit of Chemical Formula 1 in an amount of 90 mol % or more to maintain an appropriate glass transition temperature, thereby maintaining improved durability, water vapor transmission resistance, deformation resistance, and optical characteristics.

According to an exemplary embodiment of the present invention, the adhesive layer may have a storage modulus of 2.0 MPa to 8.0 MPa at −60° C., 0.4 MPa to 1.0 MPa at −40° C., 0.1 MPa to 1.0 MPa at 0° C., 0.05 MPa to 0.2 MPa at 20° C., and 0.05 MPa to 0.2 MPa at 60° C.

The storage modulus of the adhesive layer maintains the range at each temperature, so that even though the adhesive layer is applied to a final product, there is a benefit in that the deformation is small and the dimensional stability is high, and restorability against bending, and the like and long-term durability may be improved. Furthermore, since there is no big difference in the storage elastic modulus range at room temperature or higher, the deformation of a product may be small, and excellent physical property reliability may be implemented. When the storage modulus of the adhesive layer is out of the range at each temperature, deformation according to the temperature occurs, and as a result, the reliability of the product may deteriorate and the durability may be weakened, and when the adhesive layer is applied to a final product, permanent deformation occurs, and as a result, it may be difficult to implement flexible physical properties.

The adhesive layer is prepared from the adhesive composition for optical use, and thus may exhibit characteristics in that the peel strength against a substrate is high and the water vapor transmission rate is low.

According to an exemplary embodiment of the present invention, the adhesive layer may have a peel strength against a glass substrate of about 800 g/in or more, specifically about 900 g/in to about 1,500 g/in, and more specifically about 960 g/in to about 1,300 g/in, or about 1,050 g/in to about 1,300 g/in.

Simultaneously, according to an exemplary embodiment of the present invention, the adhesive layer may have a water vapor transmission rate (WVTR) of about 1.0 $g/m^2 \cdot 24$ hr to about 50.0 $g/m^2 \cdot 24$ hr, for example, about 10 $g/m^2 \cdot 24$ hr to about 45 $g/m^2 \cdot 24$ hr, or about 30 $g/m^2 \cdot 24$ hr to about 45 $g/m^2 \cdot 24$ hr. The adhesive layer may simultaneously exhibit a peel strength and a water vapor transmission rate within the ranges through the adhesive composition for optical use, and as a result, an adhesive film for optical use including the adhesive layer is applied to a display or an electronic device, and thus may simultaneously exhibit excellent barrier performance and durability.

According to an exemplary embodiment of the present invention, the adhesive layer may have a light transmittance of about 90% or more, for example, about 92% or more. Furthermore, according to an exemplary embodiment of the present invention, the adhesive layer may have a haze of less than about 1%, for example, less than about 0.85%.

When the adhesive layer satisfies a light transmittance and a haze within the ranges, the adhesive layer may be usefully applied to parts of displays or electronic devices, which require the visibility, and may improve visibility based on excellent optical characteristics.

The adhesive layer is formed from the adhesive composition for optical use, and it may be the most preferable that all of the storage modulus, the water vapor transmission rate, the light transmittance, and the haze simultaneously satisfy the above-described ranges. The most preferable adhesive layer may be implemented by simultaneously controlling the mol % ratio of the cis structural unit of Chemical Formula 1, the hydroxyl value, and the wt % of the (meth)acrylate group of the polybutadiene rubber included in the adhesive composition for optical use.

Hereinafter, specific examples of the present invention will be suggested. However, the Examples described below are only provided for specifically exemplifying or explaining the present invention, and the present invention is not limited thereby.

PREPARATION EXAMPLES

Preparation Example 1

Step 1: 14 wt % of a butadiene rubber (cis content of 97 mol %, BR1208, LG Chem.) was dissolved in toluene at 80° C. for 6 hours in a 2 L reactor in which a nitrogen gas was refluxed and a cooling device was installed so as to easily adjust the temperature, and then the temperature was lowered to 35° C. Next, 10 parts by weight of a peroxide (mCPBA: meta-chloroperoxybenzoic acid) was introduced into 100 parts by weight of the butadiene rubber, and then the resulting mixture was stirred at 35° C. for 4 hours. Next, 10 parts by weight of an aqueous hydrochloric acid solution having a concentration of 1 N was put into 100 parts by weight of the rubber, the resulting mixture was stirred at 35° C. for 1 hour, and then the temperature was increased to 90° C., and the mixture was stirred for 1 hour.

Step 2: Next, 3 parts by weight of acryloyloxy ethyl isocyanate and 200 ppm of dibutyltin dilaurate (DBTDL) were put into 100 parts by weight of the rubber, and then the resulting mixture was maintained at 80° C. for 3 hours.

Through the steps, a polybutadiene rubber having a structure of Chemical Formula 3 and a hydroxyl value of 3.86 mgKOH/g and including 3 wt % of an acrylate group was prepared.

Preparation Example 2

Step 1: A process was performed under the same condition and composition as those in Preparation Example 1, except that 15 parts by weight of the peroxide (mCPBA: meta-chloroperoxybenzoic acid) in Preparation Example 1 was introduced thereinto.

Step 2: the same as Step 2 in Preparation Example 1

Through the steps, a polybutadiene rubber having a structure of Chemical Formula 3 and a hydroxyl value of 5.79 mgKOH/g and including 3 wt % of an acrylate group was prepared.

Preparation Example 3

Step 1: A process was performed under the same condition and composition as those in Preparation Example 1, except that 20 parts by weight of the peroxide (mCPBA: meta-chloroperoxybenzoic acid) in Preparation Example 1 was introduced thereinto.

Step 2: the same as Step 2 in Preparation Example 1

Through the steps, a polybutadiene rubber having a structure of Chemical Formula 3 and a hydroxyl value of 7.84 mgKOH/g and including 3 wt % of an acrylate group was prepared.

Preparation Example 4

Step 1: A process was performed under the same condition and composition as those in Preparation Example 1, except that 20 parts by weight of the peroxide (mCPBA: meta-chloroperoxybenzoic acid) and 3 parts by weight of acryloyloxy ethyl isocyanate were introduced thereinto.

Step 2: the same as Step 2 in Preparation Example 1

Through the steps, a polybutadiene rubber having a structure of Chemical Formula 3 and a hydroxyl value of 7.84 mgKOH/g and including 6 wt % of an acrylate group was prepared.

Preparation Example 5

14 wt % of a butadiene rubber (cis content of 97 mol %, BR1208, LGC) was dissolved in toluene at 80° C. for 6 hours in a 2 L reactor in which a nitrogen gas was refluxed and a cooling device was installed so as to easily adjust the temperature, and then the temperature was lowered to 35° C. Next, 10 parts by weight of a peroxide (mCPBA: meta-chloroperoxybenzoic acid) was introduced into 100 parts by weight of the butadiene rubber, and then the resulting mixture was stirred at 35° C. for 4 hours. Next, 10 parts by weight of an aqueous hydrochloric acid solution having a concentration of 1 N was put into 100 parts by weight of the rubber, the resulting mixture was stirred at 35° C. for 1 hour, and then the temperature was increased to 90° C., and the mixture was stirred for 1 hour.

As a result, a polybutadiene rubber having a hydroxyl value of 3.86 mgKOH/g was prepared.

Preparation Example 6

Step 1: 14 wt % of a butadiene rubber (cis content of 36 mol %, LG Chem.) was dissolved in toluene at 80° C. for 6 hours in a 2 L reactor in which a nitrogen gas was refluxed and a cooling device was installed so as to easily adjust the temperature, and then the temperature was lowered to 35° C. Next, 10 parts by weight of a peroxide (mCPBA: meta-chloroperoxybenzoic acid) was introduced into 100 parts by weight of the butadiene rubber, and then the resulting mixture was stirred at 35° C. for 4 hours. Next, 10 parts by weight of an aqueous hydrochloric acid solution having a concentration of 1 N was put into 100 parts by weight of the rubber, the resulting mixture was stirred at 35° C. for 1 hour, and then the temperature was increased to 90° C., and the mixture was stirred for 1 hour.

Step 2: Next, 3 parts by weight of acryloyloxy ethyl isocyanate and 200 ppm of dibutyltin dilaurate (DBTDL) were put into 100 parts by weight of the rubber, and then the resulting mixture was maintained at 80° C. for 3 hours.

As a result, a polybutadiene rubber having a hydroxyl value of 3.86 mgKOH/g and including 3 wt % of an acrylate group was prepared.

TABLE 1

| | Content of cis (mol %) | Hydroxyl value (mgKOH/g) | Acrylate group (wt %) |
|---|---|---|---|
| Preparation Example 1 | 97 | 3.86 | 3 |
| Preparation Example 2 | 97 | 5.79 | 3 |
| Preparation Example 3 | 97 | 7.84 | 3 |
| Preparation Example 4 | 97 | 7.84 | 6 |
| Preparation Example 5 | 97 | 3.86 | 0 |
| Preparation Example 6 | 36 | 3.86 | 3 |

EXAMPLES AND COMPARATIVE EXAMPLES

Example 1

An adhesive composition for optical use was prepared by including the polybutadiene rubber in Preparation Example 1 and mixing 0.5 part by weight of a photo-crosslinking agent (Irgacure 184) and 10 parts by weight of an adhesion promoter (ARAKAWA Chem., PE-590) based on 100 parts by weight of the polybutadiene rubber.

Example 2

An adhesive composition for optical use was prepared by including the polybutadiene rubber in Preparation Example 2 and mixing 0.5 part by weight of a photo-crosslinking agent (Irgacure 184) and 10 parts by weight of an adhesion promoter (ARAKAWA Chem., PE-590) based on 100 parts by weight of the polybutadiene rubber.

Example 3

An adhesive composition for optical use was prepared by including the polybutadiene rubber in Preparation Example 3 and mixing 0.5 part by weight of a photo-crosslinking agent (Irgacure 184) and 10 parts by weight of an adhesion promoter (ARAKAWA Chem., PE-590) based on 100 parts by weight of the polybutadiene rubber.

Example 4

An adhesive composition for optical use was prepared by including the polybutadiene rubber in Preparation Example 4 and mixing 0.5 part by weight of a photo-crosslinking agent (Irgacure 184) and 10 parts by weight of an adhesion promoter (ARAKAWA Chem., PE-590) based on 100 parts by weight of the polybutadiene rubber.

Comparative Example 1

An adhesive composition for optical use was prepared by including the polybutadiene rubber in Preparation Example 5 and mixing 10 parts by weight of an adhesion promoter (ARAKAWA Chem., PE-590) based on 100 parts by weight of the polybutadiene rubber.

Comparative Example 2

An adhesive composition for optical use was prepared by including the polybutadiene rubber in Preparation Example 6 and mixing 0.5 part by weight of a photo-crosslinking agent (Irgacure 184) and 10 parts by weight of an adhesion promoter (ARAKAWA Chem., PE-590) based on 100 parts by weight of the polybutadiene rubber.

Comparative Example 3

For a photocurable resin including 70 wt % of 2-ethylhexyl acrylate, 10 wt % of isobornyl acrylate, and 20 wt % of hydrobutyl acrylate, an adhesive composition for optical use, including 0.3 part by weight of a photoinitiator (Irgacure 651), 0.03 part by weight of a multifunctional acrylate (Arkema, HDDA), and 0.3 part by weight of a urethane acrylate oligomer (LGH, GD-300) based on 100 parts by weight of the photocurable resin was prepared.

<Evaluation>

Each of the adhesive compositions in the Examples and the adhesive composition for optical use in Comparative Example 1 was applied in the form of a film, dried at a temperature of 120° C., and then irradiated with UV rays and photocured under a condition of 3,000 mJ/cm$^2$, thereby preparing an adhesive layer having a thickness of 25 μm.

In the case of Comparative Example 2, the adhesive composition was photocured under a condition of 1,500 mJ/cm$^2$ by using a wavelength of 350 nm, thereby preparing an adhesive layer having a thickness of 25 μm.

Experimental Example 1: Measurement of Water Vapor Transmission Rate

For each of the adhesive layers in the Examples and the Comparative Examples, a water vapor transmission rate (WVTR) was measured with a measuring apparatus (Labthink TSY-T3) by adding a predetermined amount of water into a cup under conditions of a temperature of 38° C. and a relative humidity of 90%, loading the adhesive layer thereon, capping the cup, and then using a reduced weight of water evaporated for 24 hours, and the results are shown in the following Table 3.

Experimental Example 2: Measurement of Peel Strength

For each of the adhesive layers in the Examples and the Comparative Examples, peel strength against a glass substrate was measured at a peel rate of 300 mm/min by using a universal testing machine (UTM), and the results are as shown in the following Table 3.

Experimental Example 3: Measurement of Optical Characteristics

1) Measurement (%) of Light Transmittance (T)

Each of the adhesive layers in the Examples and the Comparative Examples was attached to a transparent glass substrate, and then a light transmittance was measured by using a UV-Vis spectrometer under a room temperature condition of 20° C. to 30° C., and the results are as shown in the following Table 3.

2) Measurement (%) of Haze (H)

Each of the adhesive layers in the Examples and the Comparative Examples was attached to a transparent glass substrate, and then a haze was measured by means of a haze meter (manufactured by BYK Co., Ltd.) under a room temperature condition of 20° C. to 30° C., and the results are as shown in the following Table 3.

Experimental Example 4: Measurement of Storage Elastic Modulus (G)

For each of the adhesive layers in the Examples and the Comparative Examples, the dynamic viscoelasticity was measured (frequency 1 Hz, warming rate 2° C./min) in accordance with JIS K7244-4, the storage elastic modulus G' on the shear mode was calculated at −60° C., −40° C., 0° C., 20° C., and 60° C., and the results are shown in Table 2.

Experimental Example 5: Measurement of Durability

For each of the adhesive layers in the Examples and the Comparative Examples, a structure of a barrier cyclo-olefin polymer (COP) film/an adhesive layer/a glass substrate was formed, the structure was left to stand for 500 hours under conditions of a temperature of 85° C. and a relative humidity of 85%, the degree to which bubbles occurred was observed to evaluate the durability according to the occurrence of bubbles and the presence and absence of yellowing and lifting on the substrate, the case where no bubbles occurred, no yellowing phenomenon occurred, and no lifting phenomenon occurred was indicated as excellent (O) in Table 3 and the case where any one among them was not satisfied was indicated as insufficient (X) in Table 3.

TABLE 2

| | Cis (mol %) | Hydroxyl value (mgKOH/g) | Acrylate group (wt %) | Adhesion promoter (parts by weight) | Storage elastic modulus (MPa) | | | | |
|---|---|---|---|---|---|---|---|---|---|
| | | | | | −60° C. | −40° C. | 0° C. | 20° C. | 60° C. |
| Example 1 | 97 | 3.86 | 3 | 10 | 4.58 | 0.459 | 0.168 | 0.122 | 0.088 |
| Example 2 | | 5.79 | 3 | 10 | 4.96 | 0.459 | 0.173 | 0.119 | 0.085 |
| Example 3 | | 7.84 | 3 | 10 | 5.31 | 0.459 | 0.175 | 0.115 | 0.079 |
| Example 4 | | 7.84 | 6 | 10 | 7.94 | 0.502 | 0.211 | 0.114 | 0.075 |
| Comparative Example 1 | | 3.86 | 0 | 10 | 4.48 | 0.401 | 0.166 | 0.122 | 0.079 |
| Comparative Example 2 | 36 | 3.86 | 3 | 10 | 38.2 | 10.04 | 0.433 | 0.490 | 0.320 |
| Comparative Example 3 | Acrylic adhesive resin | | | 0 | 218 | 29.6 | 0.066 | 0.039 | 0.028 |

TABLE 3

| | Durability | Water vapor transmission rate (g/m² · 24 hr) | Peel strength (g/in) | Optical Characteristics (%) | |
|---|---|---|---|---|---|
| | | | | Light transmittance | Haze |
| Example 1 | o | 38 | 970 | 92.3 | 0.81 |
| Example 2 | o | 38 | 1100 | 92.4 | 0.83 |
| Example 3 | o | 41 | 1250 | 92.3 | 0.82 |
| Example 4 | o | 39 | 1150 | 92.3 | 0.80 |
| Comparative Example 1 | x | 38 | 950 | 92.4 | 0.80 |
| Comparative Example 2 | o | 52 | 1090 | 92.1 | 0.93 |
| Comparative Example 3 | o | 185 | 1600 | 92.8 | 0.31 |

It can be confirmed that the adhesive films for optical use, which were prepared in Examples 1 to 4, may reduce the deformation according to the process and use and maximize the durability and dimensional stability by maintaining the storage elastic modulus values of 2.0 MPa to 8.0 MPa at −60° C., 0.4 MPa to 1.0 MPa at −40° C., 0.1 MPa to 1.0 MPa at 0° C., 0.05 MPa to 0.2 MPa at 20° C., and 0.05 MPa to 0.2 MPa at 60° C. In addition, it can be confirmed that the adhesive films have a transmittance of 92% or more, a haze value of less than 0.9%, a glass peel strength of 900 g/in or more, and a water vapor transmission rate of less than 50 g/m²·24 hr, and are optimized for an adhesive film for optical use, which is applied to a flexible device.

In contrast, it can be confirmed that Comparative Example 1 does not include an acrylate group, and as a result, the durability is significantly weakened.

Comparative Example 2 exhibited that the storage elastic modulus was decreased at low temperature because the storage elastic modulus is out of the range of 2.0 MPa to 6.0 MPa at −60° C. and 0.4 MPa to 1.0 MPa at −40° C. by using a butadiene rubber having a cis content of 36%. As a result, in Comparative Example 2, it was possible to observe a phenomenon in which adhesion with the substrate significantly deteriorates during the folding process at low temperature.

Comparative Example 3 is an adhesive layer using an acrylate-based resin, and it can be confirmed that the storage elastic modulus range is significantly different from the other storage elastic modulus ranges, and as a result, when the adhesive layer is applied to a final product, severe deformation of the produce may occur.

The invention claimed is:

1. An adhesive composition for optical use, comprising:
a polybutadiene rubber having a reactive group bonded to the main chain of the polybutadiene rubber, the reactive group including one or more selected from the group consisting of a hydroxy group and a (meth)acrylate group, wherein the polybutadiene rubber comprises a first structural unit represented by the following Chemical Formula 1, and wherein the first structural unit has a molar ratio of a cis structure to a trans structure of 9:1 to 10:0:

[Chemical Formula 1]

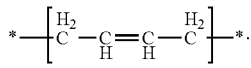

2. The adhesive composition of claim 1, wherein the polybutadiene rubber further comprises a second structural unit represented by the following Chemical Formula 2:

[Chemical Formula 2]

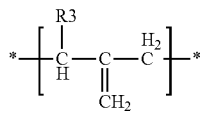

in Chemical Formula 2,

R3 is a hydroxy group; $H_2C=C(R5)$-COO—*; or $H_2C=C(R6)$-COO—R7-NH—COO—*,

R5 and R6 are each independently hydrogen; or a substituted or unsubstituted alkyl group having 1 to 10 carbon atoms, and R7 is a direct bond; or a substituted or unsubstituted alkylene group having 1 to 10 carbon atoms.

3. The adhesive composition of claim 2, wherein the second structural unit represented by Chemical Formula 2 comprises at least one of structural unit represented by the following Chemical Formulae 2-1 to 2-3:

[Chemical Formula 2-1]

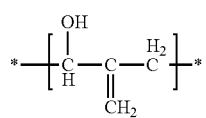

[Chemical Formula 2-2]

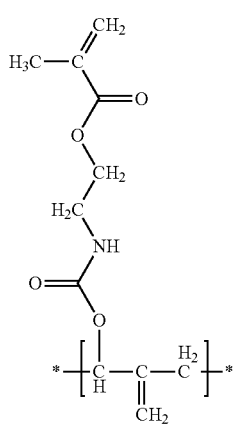

[Chemical Formula 2-3]

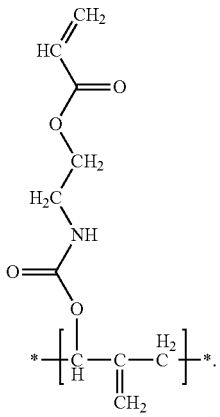

4. The adhesive composition of claim 1, wherein both ends of the main chain of the polybutadiene rubber are each independently hydrogen; or a substituted or unsubstituted alkyl group having 1 to 16 carbon atoms.

5. The adhesive composition of claim 1, wherein the polybutadiene rubber is represented by the following Chemical Formula 3:

[Chemical Formula 3]

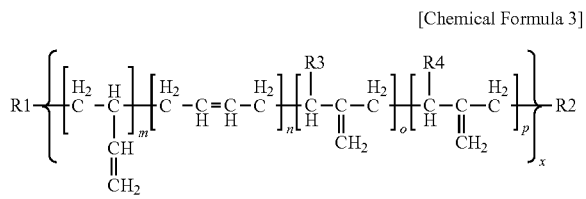

in Chemical Formula 3,

R1 and R2 are each hydrogen; or a substituted or unsubstituted alkyl group having 1 to 16 carbon atoms, R3 is a hydroxy group, R4 is $H_2C=C(R5)$-COO—*; or $H_2C=C(R6)$-COO—R7-NH—COO—*, R5 and R6 are each independently hydrogen; or a substituted or unsubstituted alkyl group having 1 to 10 carbon atoms, R7 is a direct bond; or a substituted or unsubstituted alkylene group having 1 to 10 carbon atoms, m is 0 mol % to 9 mol %, n is 75 mol % to 100 mol %, o is 0 mol % to 15 mol %, p is 0 mol % to 10 mol %, a sum of n, o, and p is 91 mol % to 100 mol %, where a sum of m, n, o, and p is 100 mol %, and x is an integer of 150 or more and 20,000 or less.

6. The adhesive composition of claim 1, wherein the polybutadiene rubber has a number average molecular weight (Mn) of 10,000 to 1,000,000.

7. The adhesive composition of claim 1, wherein the polybutadiene rubber has a hydroxyl value of 1 mgKOH/g to 20 mgKOH/g.

8. The adhesive composition of claim 1, wherein the reactive group comprises the (meth)acrylate group, and the (meth)acrylate group is present in an amount of 1 wt % to 10 wt % based on the total weight of the polybutadiene rubber.

9. The adhesive composition of claim 1, further comprising:
one or more selected from the group consisting of a photoinitiator, a photo-crosslinking agent, and an adhesion promoter.

10. An adhesive film for optical use, comprising:
an adhesive layer comprising a photocured product of the adhesive composition of claim 1.

11. The adhesive film of claim 10, wherein the adhesive layer has a glass transition temperature of −106° C. to −70° C.

12. The adhesive film of claim 10, wherein the adhesive layer has a storage modulus of 2.0 MPa to 8.0 MPa at −60° C., 0.4 MPa to 1.0 MPa at −40° C., 0.1 MPa to 1.0 MPa at 0° C., 0.05 MPa to 0.2 MPa at 20° C., and 0.05 MPa to 0.2 MPa at 60° C.

13. The adhesive film of claim 10, wherein the adhesive layer has a light transmittance of 90% or more.

14. The adhesive film of claim 10, wherein the adhesive layer has a water vapor transmission rate of 1.0 g/m²·24 hr to 50.0 g/m²·24 hr.

* * * * *